Jan. 22, 1957

K. W. HEINEMANN 2,778,117

MEASURING DEVICE

Filed Feb. 11, 1955

INVENTOR.
KURT WILHELM HEINEMANN.

BY William R. Sherman

HIS ATTORNEY.

Jan. 22, 1957

K. W. HEINEMANN
MEASURING DEVICE 2,778,117

Filed Feb. 11, 1955

*INVENTOR.*
KURT WILHELM HEINEMANN.
BY *William R. Sherman*
HIS ATTORNEY.

United States Patent Office 2,778,117
Patented Jan. 22, 1957

2,778,117

MEASURING DEVICE

Kurt Wilhelm Heinemann, Houston, Tex., assignor to Schlumberger Well Surveying Corporation, Houston, Tex., a corporation of Delaware Application February 11, 1955, Serial No. 487,506

19 Claims. (Cl. 33—134)

This invention relates to measuring devices and, more particularly, to devices for measuring the length or movement of elongated linear articles such as wire, cable or the like in their lengthwise direction.

In the use of linear articles such as cable, wire, cord, ribbon or the like, measurement of the length or of the lengthwise movement of such articles is commonly required. For example, in the use of electric cable or wire line in many well services, the length of such cable or wire line in the well must be known with a high degree of precision in order that a tool suspended therefrom may be located accurately at a given depth. For this purpose, linear measurement must be made for both directions of travel of the cable or wire line and an indication derived of the net travel past the point of measurement.

Quite commonly, a measuring wheel and associated counter are employed for obtaining linear measurements with elongated articles. One obstacle to accuracy in measurements with such measuring wheels has been slippage between the article and the measuring wheel so that angular movement of the wheel does not exactly correspond to linear movement of the article. In an attempt to overcome this obstacle, resort has been taken to the use of idler wheels for increasing the pressure between the measuring wheel and the article to be measured. While an increase in pressure will reduce the likelihood of slippage, the resultant deformation of the article and even of the measuring wheel leads again to inaccuracies. Use of two measuring wheels synchronized in their rotation by a mechanical drive has also been proposed. Since two wheels cannot practically be made with identical circumferences, however, one or both will slip and generate inaccuracies.

Accordingly, it is an object of this invention to provide new and improved apparatus for accurate linear measurement of elongated articles such as cable, wire, rope, ribbons or the like, which apparatus overcomes the above-described deficiencies of prior art devices.

Another object of this invention is to provide such apparatus capable of developing a relatively high torque on a shaft turning in proportion to the linear measurement.

Yet another object of this invention is to provide such apparatus wherein torque transmitted by a measuring wheel is mechanically amplified.

Still another object of this invention is to provide such apparatus wherein a torque is developed greater than the slippage torque of a measuring wheel, but without slippage.

Yet a further object of this invention is to provide such apparatus requiring no external source of power for accurate linear measurement of elongated articles.

These and other objects are attained by coupling a measuring wheel to an output shaft through a torque amplifying auxiliary wheel with both wheels engaging a wire, cable or like article to be measured. More particularly, the measuring wheel is coupled to the output shaft with a fixed speed ratio by means of a friction element such as a friction band. A second friction element such as a friction drum is coupled to the auxiliary wheel to transmit its torque to the output shaft by overrunning engagement with the friction band. Through this engagement the full torque available from the auxiliary wheel may be delivered to the output shaft before more than a nominal torque is derived from the measuring wheel.

In one embodiment, the elongated article is engaged between the measuring and auxiliary wheels. In a second embodiment, idlers hold the elongated article against the auxiliary wheel with a relatively high pressure and against the measuring wheel with a relatively light pressure.

The invention, together with others of its objects and advantages, will be more clearly perceived from the following detailed description, taken in conjunction with the drawings, in which.

Figure 1:
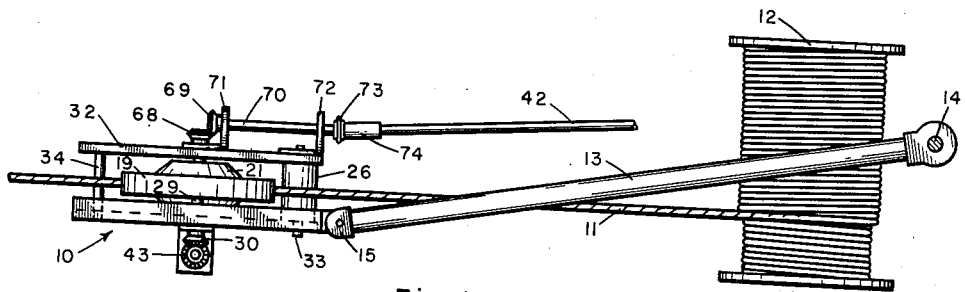
Fig. 1 is a plan view of a measuring device constructed in accordance with this invention and arranged for measuring cable reeled off a drum.

In the figures, like reference numerals are used to designate similar elements. While the apparatus of this invention is capable of measuring a great variety of elongated, linear articles such as rope, wire, ribbon and the like, its utility is here illustrated by the measurement of armored cable 11 wound and unwound from drum 12 of a winch, the free end of the cable 11 being lowered into a borehole, for example, to support well logging apparatus (not shown). A boom 13 pivotally carried on a support post 14 located behind the drum 12 is connected to the measuring device 10 by a knuckle joint 15 so that the measuring device 10 may line up with the cable 11 continuously as the cable on the drum 12 is reeled or spooled.

The measuring device 10 includes a rigid frame 18 rotatably supporting a measuring wheel 19, and a movable frame 20 rotatably carrying an auxiliary or guiding wheel 21. Comprising the fixed frame 18 are an upright member 24 to which the knuckle joint 15 is affixed, a journal block 25 extending forwardly from the upper end of the upright member 24, and a crosspiece 26 extending laterally from the lower end of the member 24 so as to underlie the cable 11. The measuring wheel 19 is supported by a cantilever shaft 29 having its journal in the block 25 and connected with a crown or beveled gear 30 on the side of the block opposite the measuring wheel 19.

Figure 3:
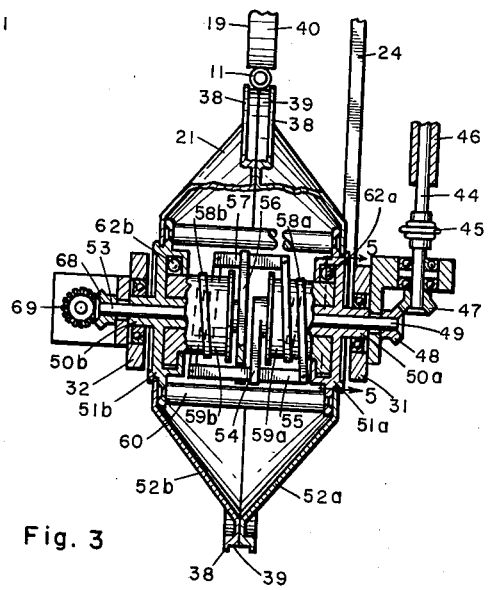
Fig. 3 is an enlarged sectional view taken along the line 3—3 of Fig. 2.

Of U-shaped form is the movable frame 20 comprising parallel links 31, 32 rigidly connected at one end by a rod 34 and pivotally supported at the other end on shaft 33 carried by the crosspiece 26. Guiding wheel 21 is journaled in the links 31, 32 on an axis vertically beneath the axis of the measuring wheel 19 and is urged into peripheral contact with the measuring wheel 19 by the resilience of a tension spring 36 connected between the journal block 25 and the link 31 remotely from the shaft 33, that is, at the forward end of the measuring device, It will be observed that the fixed frame 18 and movable frame 20 are open above the link 32 to permit moving the measuring device sidewise relative to the cable to receive the cable between the measuring wheel 19 and the guiding wheel 21 when the space between the wheels has been opened by distending the spring 36. When the cable is positioned between the wheels 19 and 21, as seen in Fig. 3, radial flanges 38 formed on either side of the peripheral surface 39 of the guiding wheel retain the cable 11 in engagement with the peripheral surface 40 of the measuring wheel. To prevent flattening of the cable as it passes between the wheels 19, 21, the spring 36 urging the wheels against the cable is designed to develop only a moderate pressure therebetween.

Preferably, the peripheral surface 40 of the measuring wheel will be formed with a true cylindrical shape of precise dimensions and composed of a wear-resistant material such as hardened steel. In consequence of this construction, the rotation of the measuring wheel 19 may be an accurate reflection of the linear travel of the cable 11 in contact with its surface 40. However, the relatively low coefficient of friction between the steel peripheral surface 40 and the armored exterior of the cable 11 may be found to develop an insufficient torque, free of slippage. As an example, the measuring device 10 is connected by a drive shaft 42, in one of its known applications, through a mechanical coupling to the chart drive of a galvanometric recorder (not shown). The true correspondence of chart movement to reeling of the cable is necessary to the precision of records obtained with the recorder. Because the hard surfaced measuring wheel is biased against the cable with only a moderate pressure to enhance accuracy of measurement, torque from the measuring wheel alone may be insufficient to drive the recorder, absent slippage.

Accordingly, the guiding wheel 21 is arranged to amplify the torque available from the measuring wheel 19 and desirable has a peripheral surface 39 with a high coefficient of friction to maximize the torque available for amplifying purposes. Thus, the peripheral surface or rim of the guiding wheel 21 may be composed of neoprene, nylon or other material having a high coefficient of friction but less wear-resistant than steel. It also could be composed of steel, if so desired. While the radius of the guiding wheel 21 is desirably somewhat smaller than the radius of the measuring wheel 19 for reasons hereafter explained, the high coefficient of friction obtained at the peripheral surface 39 permits a substantially higher torque to be imparted by the cable to the guiding wheel than to the measuring wheel. However, it is desirable that the guiding wheel rather than the measuring wheel should slip in the event that the load requires a torque higher than that which can be delivered from the guiding wheel alone.

A torque amplifier is accordingly connected between the wheels 19 and 21 and the drive shaft 42 to transmit up to the full torque available from the guiding wheel and only a nominal amount of torque from the measuring wheel unless the guiding wheel is caused to slip. To this end, torque from the measuring wheel 19 is transmitted through its shaft 29 and crown gear 30 to crown gear 43 secured to a vertically disposed shaft 44 which includes a flexible coupling 45 and a longitudinal slip connection 46. Torque in the vertical shaft 44 is then transmitted through meshed crown gears 47, 48 to input shaft 49 of the torque amplifier. This input shaft extends through a hollow spindle 50a journaled in the link 31 and having a radial flange portion 51a supporting a shell-like half section 52a of the guiding wheel. The other half section 52b is similarly supported by a radial flange portion 51b of the hollow spindle 50b journaled in link 32. An output shaft 53 of the torque amplifier is journaled in the spindle 50b and is aligned with input shaft 49.

Secured to the inner end of the input shaft 49 is a radial arm 54 supporting a cross member 55. A radial arm 56 carrying a cross member 57 is similarly secured to the inner end of the output shaft 53. To connect the input shaft 49 to the output shaft 53 with a fixed turns ratio of 1:1, friction bands 58a and 58b are wrapped in similarly directed helices about friction drums 59a and 59b, respectively, each band connecting the ends of the cross members 55 and 57 disposed on the same side of the arms 54 and 56. Suitably, the bands 58a, 58b are composed of a metal such as steel or a plastic such as glass fibers bonded in Epon, a resinous binder manufactured by the Shell Chemical Corporation. The drums 59a, 59b, preferably formed of a material such as steel or graphite, are rotatably carried on the spindles 50a and 50b, respectively. These spindles, in turn, are corotatively secured to the shell-like sections 52a and 52b and are secured one to the other by cross rods 60, so that rotation of the rim 39 with movement of the cable is imparted directly to both of the spindles 50a and 50b.

For selectively connecting the drums 59a and 59b to the rim of the guiding wheel for corotation dependent upon the direction of such rotation, clutches 62a and 62b are disposed between the respective drums and spindles with opposite rotary directions of engagement. In one convenient form, best seen in Fig. 5, balls 63 disposed in wedge-shaped recesses 64 formed in the drums are urged in the direction of locking engagement with the corresponding spindle by means of springs 65. Rotation of the spindle in this locking direction engages the clutch to turn the corresponding drum at the same rate of rotation. Rotation of the spindle in the opposite direction, corresponding to reverse movement of the cable, tends to retract the balls into the recesses 64 against the action of springs 65 to permit free running between the spindle and the drum. The direction for locking engagement of clutch 62a is shown by the arrow in Fig. 4, while the direction for locking engagement of clutch 62b is the opposite.

The arm 56 also has a forked portion 66 which, under normal angular relations, receives the cross member 55 loosely without any transmission of torque. Should a band break, however, the forked portion 56 affords an emergency connection between the input shaft 49 and output shaft 53 of the torque amplifier. Whether the torque is transmitted through the amplifier by the bands or by the emergency connection, the torque on the output shaft 53 is coupled through crown gears 68, 69 to shaft 70 carried on angle brackets 71, 72 carried by the link 32. The shaft 70, in turn, is connected by flexible coupling 73 and slip connection 74 to the drive shaft 42.

Figure 2:
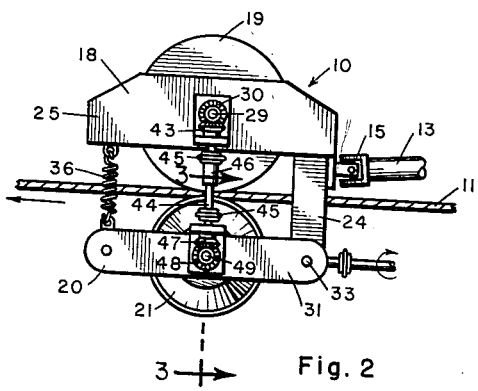
Fig. 2 is a side elevational view of the measuring device.

In operation, the measuring device 10 is swung upon the boom 13 to bring the measuring wheel 19 and guiding wheel 21 into contact with the cable 11, the spring-supported end of the movable frame 20 being lowered so that the cable may be received between the wheels. With the spring 36 urging the peripheral surfaces 39 and 40 of the wheels 21 and 19 into opposed pressure engagement with the cable, the cable is reeled on or off the drum 12 as desired. Assuming that a measurement is taken while the cable is being run off the drum 12 in the direction indicated by the arrow (Fig. 2), the manner of obtaining torque amplification may best be explained with reference to those portions of the apparatus shown in Fig. 4. Rotation of the measuring wheel 19 by the cable 11 will be observed to produce a torque on the input shaft 49 of the torque amplifier indicated by the arrow in Fig. 4. The rotation of the guiding wheel 21 imparted by movement of the cable 11 will produce a torque engaging the clutch 62a and transmitted directly thereby to the drum 59a in the direction indicated by the arrow.

Figure 4:
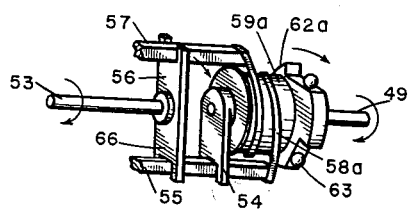
Fig. 4 is a diagrammatic representation of portions of the measuring device to illustrate the principles of its torque amplification.
Figure 5:
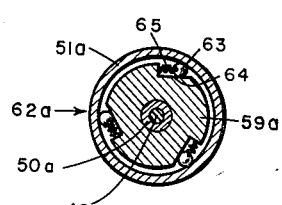
Fig. 5 is a sectional view taken along the line 5—5 of Fig. 3 to illustrate the clutch mechanism.

Assuming that the crown gears 30, 43, 47, 48 have a 1:1 ratio, as is preferred, the larger diameter of the measuring wheel 19 will result in a slower speed of the shaft 49 relative to the speed of drum 59a. Therefore, while the torque transmitted by shaft 49 will turn the arm 54 in the direction indicated by the arrow to tighten the band 58a on the drum 59a, only a slight torque will be required to develop a high normal force as the drum 59a will be slipping under the band 58a in a direction tending to tighten the band. At the same time, the drum turning in overrunning engagement with the band will frictionally impart a torque thereto which is transmitted to the arm 56 and thence to the output shaft 53 of the torque amplifier. As indicated in Fig. 4, the output shaft 53 will turn in the same direction as the input shaft 49 with a rate of turning identical to that of the input shaft due to the connection of the arms 54 and 56 through the band 58a.

Assume now that torque load on the output shaft 53 is gradually increased until it equals the total torque which the cable can impart both to the guiding wheel 21 and to the measuring wheel 19. As the output torque approaches the maximum torque deliverable by the guiding wheel 21, the torque delivered from the measuring wheel 19 will remain at a nominal value sufficient merely to maintain the band 58a tight upon the drum 59a. Such nominal torque being substantially less than the maximum available torque from the measuring wheel 19, the rotation of the measuring wheel 19 will be directly imparted to the output shaft 53 without any inaccuracy due to slippage. When the torque load on the shaft 53 exceeds the maximum deliverable from the guiding wheel 21, the guiding wheel will begin to slip so that the rotation of the drum 59a will exceed that of the shaft 49 by a lesser amount. As a result of this change in the relative rates of rotation, a greater torque will be derived from the measuring wheel additive with the torque from the guiding wheel to turn the load on the shaft 53. In this manner, the output torque load may be raised above the torque deliverable by the guiding wheel an amount equal to the maximum torque obtainable from the measuring wheel before inaccuracy in the linear measurement of the cable 11 occurs.

When the cable 11 is spooled onto the drum, the clutch 62b engages without appreciable backlash while the clutch 62a disengages. The input and output shafts 49 and 53 turn in the opposite direction with the amplifying torque from the guiding wheel being furnished through the frictional contact of band 58b with the surface of drum 59b. Should either or both bands 58a, 58b break, the full torque of the measuring wheel 19 will be transmitted to the drive shaft 42 with only a slight amount of backlash occurring between the cross member 55 and the forked portion 66 of the arm 56.

Figure 6:
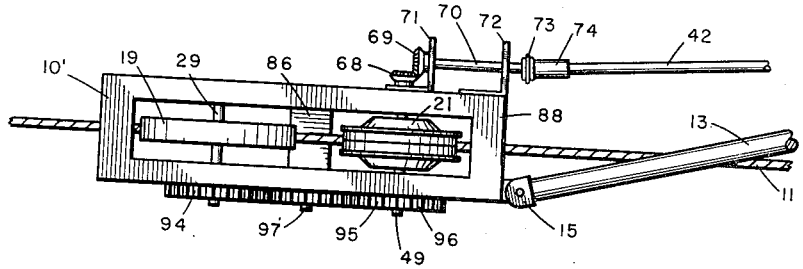
Fig. 6 is a plan view of a modified version of the measuring device of this invention.
Figure 7:
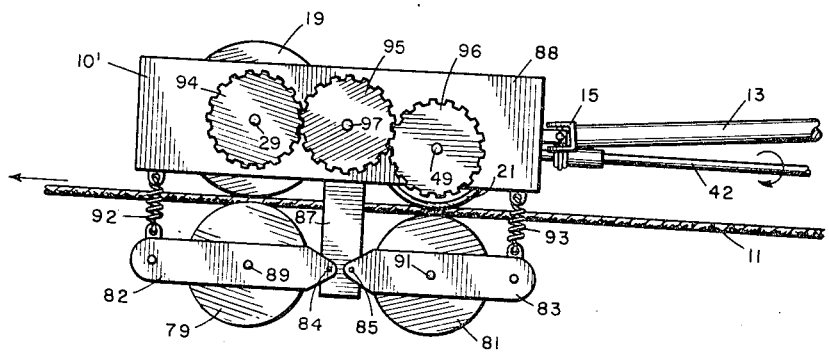
Fig. 7 is a side elevational view of the modified measuring device.

In an embodiment 10' of the measuring device, shown in Figs. 6 and 7, the measuring wheel 19 and auxiliary wheel 20 are not restricted to the same pressure of engagement with the linear article being measured, as was the case with the embodiment 10 of Figs. 1 to 5. Instead, idler wheels 79 and 81, respectively, urge the cable 11 against the measuring wheel rim and the auxiliary wheel rim at spaced points along the cable.

More particularly, idlers 79, 81 are rotatively supported in separate frames 82, 83, respectively, of construction similar to frame 20 (Fig. 2) and pivotally mounted at 84, 85 on a bottom cross piece 86 of an upright member 87, which is dependently carried by a box-like main frame 88. Rotatively mounted within the main frame 88 directly above the idler 79 is the measuring wheel 19. Axis 29 of the measuring wheel 19 is thus vertically above axis 89 of the idler 79. Similarly, the auxiliary wheel 21 has its axis 49 rotatively journaled in the frame 88 directly above axis 91 of the idler 81.

To urge the idlers 79, 81 resiliently toward the measuring wheel 19 and auxiliary wheel 21, respectively, a relatively light spring 92 is connected under tension between the free end of the movable frame 82 and a point on the main frame 88 thereabove, while a relatively heavy spring 93 similarly joins the outer or free end of the frame 83 with a point on the main frame 88 thereabove. Otherwise expressed, the spring constant of spring 92 is smaller than that of spring 93 so that a relatively light pressure is developed between the idler 79 and measuring wheel 19, while a relatively high or large pressure is developed between idler 81 and the auxiliary wheel 21. As shown, spring 92 acting through frame 82 has a mechanical advantage in upwardly pressing the idler 79 identical to the mechanical advantage of spring 93 operating through frame 83 to press the idler 81 upwardly. It is evident, however, that the mechanical advantages might be different in order otherwise to achieve or accentuate the differences in the upward pressures of idlers 79 and 81.

To couple the rotations of the measuring wheel 19 to the input shaft 49 of the auxiliary wheel, the measuring wheel axis or shaft 29 is keyed to a gear 94 coupled through a gear train comprising gears 95 and 96 with the input shaft 49. It may be observed that a rotation is imparted to gear 96 keyed to the input shaft 49 of the same sense as that of gear 94 by reason of the intermediate gear 95 journaled in the frame at a point 97. The gears 94, 95 and 96 are shown to be equal-sized for a 1:1 ratio.

Conveniently, the knuckle joint 15 connects the boom 13 directly to the main frame 88. Also, since the auxiliary wheel 21 is journaled in the main frame 88, the angle brackets 71, 72 are affixed to the main frame to properly support shafts 70, 42 in relation to the crown gears 68, 69.

In operation, the modified measuring device 10' receives a linear elongated article, such as cable 11, either laterally or by longitudinal threading between the measuring wheel 19 and idler wheel 79 and also between the auxiliary wheel 21 and idler 81. With the article in relatively light pressure engagement with the rim of the measuring wheel 19 and more strongly urged against the rim of the auxiliary wheel 21, relative motion is produced between the cable 11 and the measuring device, as by reeling the cable.

Assuming that the cable moves in the direction indicated by the arrow in Fig. 7, the measuring wheel 19 will turn the gear 94 in a clockwise direction, thereby turning the gear 95 in a counter-clockwise direction. Gear 95, in turn, rotates the gear 96 and input shaft 49 in a clockwise direction, thereby engaging the band 58b upon the drum 59b.

Since the auxiliary wheel 21 is also rotated by its engagement with the cable 11 and, in fact, with a substantial torque due to the high force of engagement induced by spring 93, the drum 59b will also be rotated in the direction of the band 58b but in overrunning relation. Consequently, an amplified torque will be developed upon the output shaft 53 of the torque amplifier, which torque is coupled to the drive shaft 42. By comparing Figs. 2 and 7, it will be observed that the drive shaft 42 turns in opposite directions in the two embodiments where the cable is moved in the same direction.

The embodiment of Figs. 6 and 7 is susceptible to a number of alterations in addition to change in the mechanical advantage of the springs 92, 93. Thus, the position of the auxiliary and measuring wheels and of the idlers could be transposed so that, for example, the measuring wheel and auxiliary wheel were held by the idlers in engagement with the cable on opposite sides thereof. The arrangement and turns ratio of the gear train might also be altered, provided that the input shaft 49 was rotated in the proper sense relative to rotation of the auxiliary wheel 21 so that the drums are overdriven relative to the bands. The construction of the support structure including the frames 82, 83 and 88 is, of course, subject to modification including the enclosure of the gear train.

With each of the embodiments of this invention, then, the torque of the measuring wheel is supplemented by that of the guiding wheel to drive a load in exact correspondence with the rotation of the measuring wheel, regardless of overloading and slippage of the guiding wheel. At the same time, the measuring device is capable of delivering the total of the maximum available torques from both the measuring wheel and the driving wheel.

While a particular torque amplifying arrangement has been shown and described, it will be apparent that other torque amplifiers suitable for coupling the auxiliary and measuring wheels to the output shaft may also be employed. Likewise, in lieu of the disclosed clutch arrangement, other clutch arrangements preferably having as low a degree of backlash might alternatively be employed which fulfill the same function.

Although the guiding wheel has been shown of smaller diameter than the measuring wheel in order that the drum speed may exceed that of the input shaft for overrunning the friction band, it will be apparent that the guiding wheel may be of equal or larger diameter than the measuring wheel where the drive connection to the input of the torque amplifier has a turns ratio which causes the rate of rotation of the drum to exceed that of the friction band. Should linear measurements be required in only one running direction, the torque amplifier 42 might correspondingly be simplified.

In the many applications of the measuring device of this invention, it will be evident that a variety of suitable mountings in lieu of the boom 13 may be resorted to, and that the configuration of the various wheel rims may be adapted to the configuration of the linear article subjected to measurement.

These and other modifications lying within the true scope and spirit of this invention are intended to be embraced within the ambit of the appended claims.

I claim:

1. In apparatus for measuring wire, cable or a like article, a measuring wheel and an auxiliary wheel mounted for rotating engagement with such an article, an output shaft, means for coupling said measuring wheel to said output shaft with a fixed speed ratio, and means for transmitting torque from said auxiliary wheel to said output shaft while permitting slippage therebetween.

2. In apparatus for measuring wire, cable or a like article, a measuring wheel and an auxiliary wheel mounted for rotating engagement with such an article, an output shaft, means including a friction element for coupling said measuring wheel to said output shaft with a fixed speed ratio, and means for frictionally coupling said auxiliary wheel to said friction element for transmitting torque to said output shaft.

3. In apparatus for measuring wire, cable or a like article, a measuring wheel and an auxiliary wheel mounted for rotating pressure engagement with such an article, an output shaft, means including a friction element for coupling said measuring wheel to said output shaft with a fixed speed ratio, and means for frictionally coupling said auxiliary wheel in overrunning relation to said friction element to transmit torque from said auxiliary wheel to said output shaft while permitting slippage therebetween.

4. In apparatus for measuring wire, cable or a like article, a measuring wheel and an auxiliary wheel mounted for rotating pressure engagement with such an article, an output shaft, means including a friction band for coupling said measuring wheel to said output shaft with a fixed speed ratio, and means including a drum in frictional engagement with said band for transmitting torque from said auxiliary wheel to said output shaft while permitting slippage therebetween.

5. In apparatus for measuring wire, cable or a like article, a measuring wheel and an auxiliary wheel mounted for rotating pressure engagement with such an article, an output shaft, means including a friction band for coupling said measuring wheel to said output shaft with a fixed speed ratio, and means including a friction drum carrying said band therearound for coupling said auxiliary wheel with said friction band in overrunning relation thereby to transmit torque to said output shaft.

6. In apparatus for measuring wire, cable or a like article, a measuring wheel and an auxiliary wheel mounted to rotatively receive such an article therebetween in pressure engagement with their peripheral surfaces, an output shaft, means for coupling said measuring wheel to said output shaft with a fixed speed ratio, and means for transmitting torque from said auxiliary wheel to said output shaft while permitting slippage therebetween.

7. In apparatus for measuring wire, cable or a like article, a measuring wheel and an auxiliary wheel mounted for rotative engagement of their peripheral surfaces with such an article positioned therebetween, said measuring wheel having a highly wear-resistant peripheral surface of low coefficient of friction, said auxiliary wheel having a peripheral surface of a relatively high coefficient of friction, an output shaft, means for coupling said measuring wheel to said output shaft with a fixed speed ratio and a nominal torque loading in the absence of slippage of said auxiliary wheel, and means for transmitting torque from said auxiliary wheel to said output shaft while permitting slippage therebetween.

8. In apparatus for measuring an elongated linear article, a measuring wheel and an auxiliary wheel mounted for rotating engagement with such an article, an output shaft, variable torque transmitting means for coupling said auxiliary wheel to said output shaft with a variable speed ratio, said transmitting means including means coupled to said measuring wheel for varying the torque transmitted to said output shaft to produce a fixed speed ratio between said output shaft and said measuring wheel.

9. In apparatus for measuring wire, cable or a like article, a measuring wheel and an auxiliary wheel having their peripheral surfaces resiliently urged together to press upon such an article in rotative engagement therewith, an output shaft, means including a friction element for coupling said measuring wheel to said output shaft with a fixed speed ratio, and means for frictionally coupling said auxiliary wheel with said friction element in overrunning relation to normally limit the torque transmitted from said measuring wheel to a nominal amount while transmitting torque to said output shaft.

10. In apparatus for measuring wire, cable or a like article, a measuring wheel and an auxiliary wheel resiliently urged toward peripheral engagement and adapted to receive such an article therebetween, an output shaft, torque amplifying means for coupling said measuring wheel to said output shaft with a fixed speed ratio, and means for coupling said auxiliary wheel to said torque amplifying device to amplify the torque furnished said output shaft from said measuring wheel.

11. In apparatus for measuring wire, cable or a like article, a measuring wheel and an auxiliary wheel mounted for resiliently engaging such an article passed between their peripheral surfaces, an output shaft, means including a friction element coupling said measuring wheel to said output shaft with a fixed speed ratio, said peripheral surface of said auxiliary wheel having a smaller diameter and higher coefficient of friction than the peripheral surface of said measuring wheel, and means including a second friction element engageable with said first friction element for transmitting torque from said auxiliary wheel to said output shaft.

12. In apparatus for measuring wire, cable or a like article, a measuring wheel having a wear-resistant relatively low friction rim, an auxiliary wheel having a less wear-resistant higher friction rim mounted for pressing resiliently upon such an article passed between said rims, an output shaft, means including a first friction element for coupling said measuring wheel to said output shaft with a fixed speed ratio, and means including a second friction element for coupling said auxiliary wheel to said first friction element, thereby to transmit its torque to said output shaft, said friction elements being subjected to a normal force by torque transmitted from said measuring wheel, said second friction element overrunning said first friction element.

13. In apparatus for measuring wire, cable or a like article, a frame, a measuring wheel and a guiding wheel rotatably mounted on said frame and resiliently urged toward peripheral engagement, an output shaft, an input shaft, means for coupling said measuring wheel to said input shaft, a drum mounted on said frame coaxially with said shafts, means including a friction band wrapped about the periphery of said drum for directly connecting said shafts, and means for coupling said guiding wheel to said drum for driving said drum in overrunning relation to said friction band, whereby said output shaft will have a speed determined by the rotation of said measuring wheel and a torque derived from said guiding wheel.

14. In apparatus for measuring wire, cable or a like article, a frame, a measuring wheel and a guiding wheel rotatably mounted on said frame, said guiding wheel being resiliently urged toward said measuring wheel to guide such an article against the peripheral surface of said measuring wheel, whereby both wheels are driven by movement of said article, torque amplifying means including an input and an output shaft in alignment, a pair of drums mounted coaxially with said shafts, friction bands connecting said shafts and wrapped around said drums in a direction tending to cause selective tightening of said bands in accordance with the direction of rotation of said measuring wheel, and means for coupling said drums to said guiding wheel to be overdriven thereby for transmitting torque to said output shaft without altering the fixed speed ratio between said output shaft and said measuring wheel.

15. In apparatus in accordance with claim 14, said means for coupling said drums to said guiding wheel including clutch means for selectively coupling said guiding wheel with said drums in accordance with its direction of rotation.

16. In apparatus for measuring wire, cable or a like article, a measuring wheel, an auxiliary wheel, means for pressing such an article into engagement with said wheels, an output shaft, means for coupling said measuring wheel to said output shaft with a fixed speed ratio, and means for transmitting torque from said auxiliary wheel to said output shaft while permitting slippage therebetween.

17. Apparatus as defined in claim 16, wherein said pressing means includes an idler associated with each of said wheels.

18. In apparatus for measuring wire, cable or a like article, a measuring wheel and an auxiliary wheel for engaging such an article at points spaced along its length, a first idler resiliently biased toward said measuring wheel with a relatively light force and a second idler resiliently biased toward said auxiliary wheel with a relatively strong force, an output shaft, means for coupling said measuring wheel to said output shaft with a fixed speed ratio, and means for transmitting torque from said auxiliary wheel to said output shaft.

19. In apparatus for measuring wire, cable or a like article, a frame, a measuring wheel and an auxiliary wheel rotatably mounted on said frame, a first idler, a second idler, means for resiliently urging said first idler toward said measuring wheel with a relatively light force, means for resiliently urging said second idler toward said auxiliary wheel with a relatively strong force, an output shaft rotatably carried by said frame, and torque amplifying means for coupling said measuring wheel to said output shaft with a fixed speed ratio and for transmitting torque from said auxiliary wheel to said output shaft.

No references cited.